United States Patent
Schütz et al.

(10) Patent No.: US 11,981,433 B2
(45) Date of Patent: May 14, 2024

(54) METHOD AND DEVICE FOR LIFTING A LOAD

(71) Applicant: Liebherr-Werk Biberach GmbH, Biberach an der Riss (DE)

(72) Inventors: Gebhard Schütz, Kirchberg (DE); Robert Bramberger, Vogach (DE); Tobias Scholz, Biberach (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 224 days.

(21) Appl. No.: 16/708,266

(22) Filed: Dec. 9, 2019

(65) Prior Publication Data

US 2020/0180763 A1    Jun. 11, 2020

Related U.S. Application Data

(63) Continuation of application No. PCT/EP2018/065182, filed on Jun. 8, 2018.

(30) Foreign Application Priority Data

Jun. 9, 2017    (DE) ..................... 10 2017 112 765.8

(51) Int. Cl.
*B64D 1/22*    (2006.01)
*B64C 39/02*    (2023.01)
(Continued)

(52) U.S. Cl.
CPC .............. *B64D 1/22* (2013.01); *B64C 39/024* (2013.01); *G05D 1/104* (2013.01); *B64U 2101/60* (2023.01); *B64U 2201/102* (2023.01)

(58) Field of Classification Search
CPC .......... B64D 1/22; B64D 3/00; B64C 39/024; B64C 2201/128; B64C 2201/143;
(Continued)

(56) References Cited

U.S. PATENT DOCUMENTS 3,799,358 A * 3/1974 Putnam .................. B66C 13/08
                                                      294/81.4
8,591,161 B1 * 11/2013 Bernhardt ............ G05D 1/0858
                                                      414/137.1
(Continued)

FOREIGN PATENT DOCUMENTS

DE     202016002295 U1    6/2017
EP         2172412 A1 *   4/2010    ............... A61G 1/04
(Continued)

OTHER PUBLICATIONS

D. Mellinger, Q. Lindsey, M. Shomin and V. Kumar, "Design, modeling, estimation and control for aerial grasping and manipulation," 2011 IEEE/RSJ International Conference on Intelligent Robots and Systems, San Francisco, CA, USA, 2011, pp. 2668-2673, doi: 10.1109/IROS.2011.6094871. (Year: 2011).*

*Primary Examiner* — Elaine Gort
*Assistant Examiner* — Ellis B. Ramirez
(74) *Attorney, Agent, or Firm* — Levine Bagade Han LLP

(57)    ABSTRACT

The present invention relates to a method and a device for lifting a load, wherein at least one aerial drone carries at least a portion of the load. In order to lift a load, it is proposed to yoke together a plurality of aerial drones or at least one aerial drone and a lifting hook of a crane, and provide a common control system for the plurality of aerial drones or the at least one aerial drone and the lifting hook of the crane, in order not to have to control a plurality of aerial drones at the same time, or also an aerial drone in addition to the crane hook, using separate control means, in a "multi-handed" manner. In addition to the at least one aerial drone which carries at least a portion of the load, it is proposed, according to the invention, that the load should be connected to a further aerial drone and/or a lifting hook of a crane, and also carried and/or directed by the further aerial drone or the crane lifting hook in part, wherein the two aerial drones are (Continued)

controlled together, and/or the at least one aerial drone is controlled together with the crane, in a mutually coordinated manner, by means of a common controller for controlling flight and/or crane movements.

20 Claims, 5 Drawing Sheets

(51) Int. Cl.
  *B64U 101/60* (2023.01)
  *G05D 1/00* (2024.01)
(58) Field of Classification Search
  CPC .. B64C 2201/146; B64C 19/00; G05D 1/104; B66C 13/04; B60P 3/00; B60P 3/07; B63B 21/56
  USPC ................................................ 701/3, 50, 101
  See application file for complete search history.

(56) References Cited

U.S. PATENT DOCUMENTS

| | | | |
|---|---|---|---|
| 8,761,968 B2 | 6/2014 | So et al. | |
| 9,079,662 B1* | 7/2015 | Duffy | B64D 1/22 |
| 9,146,557 B1* | 9/2015 | Ahmed | G05D 1/0858 |
| 9,205,922 B1 | 12/2015 | Bouwer | |
| 2008/0302749 A1* | 12/2008 | Sawai | B66C 23/36 212/270 |
| 2009/0152391 A1* | 6/2009 | McWhirk | B64B 1/70 244/30 |
| 2009/0299551 A1* | 12/2009 | So | B64C 39/024 701/3 |
| 2013/0211712 A1* | 8/2013 | Takeda | E02F 9/024 701/468 |
| 2014/0371956 A1* | 12/2014 | Jenkins | B63B 21/56 701/3 |
| 2015/0142277 A1* | 5/2015 | Eriksson | B66C 17/00 701/50 |
| 2015/0158576 A1 | 6/2015 | Jones et al. | |
| 2015/0274321 A1 | 10/2015 | Miller | |
| 2016/0107866 A1* | 4/2016 | Schoonmaker | B66C 13/46 701/50 |
| 2016/0340006 A1* | 11/2016 | Tang | B64C 39/024 |
| 2017/0283057 A1* | 10/2017 | Thompson | B64C 39/024 |
| 2018/0016022 A1* | 1/2018 | Ljung | B64D 35/04 |
| 2021/0024333 A1* | 1/2021 | Pedersen | B66C 1/108 |

FOREIGN PATENT DOCUMENTS

| | | |
|---|---|---|
| JP | 05-193584 | 8/1993 |
| WO | WO 2016/068767 | 5/2016 |
| WO | WO 2018/224657 | 12/2018 |

* cited by examiner

METHOD AND DEVICE FOR LIFTING A LOAD

CROSS-REFERENCE TO RELATED APPLICATIONS

This application is a continuation of International Application No. PCT/EP2018/065182, filed Jun. 8, 2018; which claims priority to German Patent Application No. 10 2017 112 765.8, filed on Jun. 9, 2017 both of which are incorporated by reference herein in their entireties.

BACKGROUND

The present invention relates to a method and a device for lifting a load, wherein at least one aerial drone carries at least a portion of the load.

Recently, it has been envisaged to lift loads by means of aerial drones, and thus be able to more flexibly perform lifting tasks that were conventionally performed by cranes, in order to reduce as far as possible, or entirely prevent, restrictions and difficulties of crane operation.

For example, in the field of construction sites there are various lifting tasks for which a crane has to be especially delivered, assembled, dismantled again, and transported away again. For example, these may be individual lifts, in order to move particular structural parts or construction tools to a particular region of a structure that is to be erected or converted. If a crane is not otherwise required at the construction site, the crane must be assembled especially for this purpose. Even if a crane per se is used on the construction site, extra lifts may arise of the kind for which a further crane is required, for example for erecting the stationary, permanent construction crane.

Hitherto, in the field of construction sites and other fields of application of cranes, such as container cranes or harbor cranes, aerial drones have been used primarily for accessory auxiliary functions, in particular in order to fly cameras or other imaging monitoring means into position, in order to monitor the crane operation or the lifting process performed by the crane. In particular, the image provided by the camera attached to the aerial drone can be displayed on a screen, in order to provide the crane operator with a different viewing angle on the crane hook.

However, if the aerial drone is involved in lifting the load, the control of the aerial drone is exposed to other influences and is significantly more difficult or more complex. In particular, the load to which the aerial drone is connected exerts significant forces on the aerial drone which do not only pull statically in the vertical direction, but rather also comprise horizontal components and can vary for example due to gusts of wind. Furthermore, pendulum motions and thus dynamic forces from the load can quickly bring the aerial drone into undesired positions or cause it to move.

Proceeding herefrom, the object of the present invention is that of providing an improved method and an improved device for lifting loads by means of an aerial drone, which overcome disadvantages of the prior art and develop said prior art in an advantageous manner. In particular, simple control of the aerial drone should be achieved, even under the influence of the load connected to the aerial drone.

SUMMARY

According to the invention, the stated object is achieved by a method according to claim 1 and a device according to claim 12. Preferred embodiments of the invention can be found in the dependent claims.

In order to lift a load, it is thus proposed to yoke together a plurality of aerial drones or at least one aerial drone and a lifting hook of a crane, and provide a common control system for the plurality of aerial drones or the at least one aerial drone and the lifting hook of the crane, in order not to have to control a plurality of aerial drones at the same time, or also an aerial drone in addition to the crane hook, using separate control means, in a "multi-handed" manner, as it were. The load is spread over the plurality of aerial drones or at least one aerial drone and one crane lifting hook. In addition to the at least one aerial drone which carries at least a portion of the load, it is proposed, according to the invention, that the load should be connected to a further aerial drone and/or a lifting hook of a crane, and also carried and/or directed by the further aerial drone or the crane lifting hook in part, wherein the two aerial drones are controlled together, and/or the at least one aerial drone is controlled together with the crane, in a mutually coordinated manner, by means of a common controller for controlling flight and/or crane movements. If the controller is for example actuated so as to move the crane lifting hook, control signals, matched thereto, for the aerial drone are also generated at the same time, in order to also fly the aerial drone accordingly. In a similar manner, when the controller is actuated in order to fly the aerial drone, a control signal that is matched thereto is automatically generated, in order to move the further aerial drone or the crane lifting hook in a corresponding manner.

If a load is lifted by a crane, for example in the form of revolving tower crane, a mobile telescopic crane or a harbor crane, one or more aerial drones can be attached to the load to be lifted, at the same time as the crane hook, or can be connected directly to the crane hook, in order to assist, in a different manner, with lifting the load. For example, the load to be lifted can be lightened for the crane, for example in order for it to be possible to lift a load that exceeds the load-bearing capacity or load capacity of the crane itself, such that the construction site operator can avoid erecting a larger crane for this lifting task. The aerial drone can thus perform purely a lifting function, and lift a load together with a crane.

Alternatively or in addition, it is also possible, however, for the aerial drone to be used, in connection with a crane, for directing the load and exerting a force on the load attached to the lifting hook, which force contains a horizontal component. If, for example, elongate loads such as steel beams or the like are lifted in a horizontal orientation, an aerial drone that is attached to the elongate load so as to be off-center can prevent or intentionally bring about rotation of the elongate load, and for example ensure that the elongate load can be lifted by the crane jib approximately in a vertical plane, and/or be placed down, at the destination, so as to be at a specified orientation to said plane.

Alternatively or in addition, horizontal forces exerted on the load or the lifting hook by the aerial drone can be used, by corresponding control of the aerial drone, for preventing and/or damping pendulum motions of the load or of the lifting hook relative to the crane jib. In particular, the aerial drone can be controlled so as to exert horizontal forces on the lifting hook and/or the load suspended thereon, which forces counteract the pendulum motion.

Alternatively or in addition thereto, the aerial drone can also exert horizontal forces on the load or the lifting hook, in order to compensate wind loads, at least in part, and/or to minimize a diagonal pull of the hoist rope as a result of wind loads on the load suspended on the lifting hook.

In order to perform the mentioned lifting and directing functions, it may be sufficient to connect an aerial drone with the lifting hook of the crane, or to the load fastened thereto. Alternatively, however, it is also possible for a plurality of aerial drones to be connected to the load or the lifting hook, wherein it may be advantageous, for example, to position at least one pair of aerial drones on opposing sides of the lifting hook, and connect them to the load or the lifting hook itself, in order to be able to exert horizontal forces on the lifting hook or the load suspended thereon in approximately mutually opposing directions, or mutually compensate said forces, if for example only the lifting ability of the aerial drones is required.

In addition to the mentioned attachment of at least one aerial drone to a crane, for specific lifting tasks it may also be advantageous to merely team-up a plurality of aerial drones and lift the corresponding load by means of a plurality of aerial drones, but without the crane or the lifting hook thereof. It is thus possible, for example, to increase the operating range for a lifting task, which range is limited, in the case of a crane, by the radius thereof. Lifting a load only by means of aerial drones can also be helpful when erecting the crane, in order, for example, to lift specific crane components when assembling the crane.

If a plurality of aerial drones is teamed or yoked and used, without a crane, for lifting a load, the common control system can keep the two aerial drones at a distance from one another and fly said drones together, along a specified flight trajectory, to a target destination. In this case, the aerial drones can be fastened to the common load by means of separate hoist ropes for example, or can be fastened to a common lifting yoke to which the load is in turn fastened.

In order for it to be possible to provide lifting forces and tensile forces, by means of the aerial drone, that are sufficient for the heavy loads in construction site operation, but at the same time to also allow for a sufficiently quick reaction of the aerial drone to control commands, and thus precise control of the lifting and/or tensile force and/or the flight trajectory of the aerial drone, in an advantageous development of the invention the aerial drone can comprise a hydrostatic drive train for driving at least one rotor of the aerial drone, wherein a hydrostatic drive train of this kind may comprise a hydrostatic device that operates as a pump and can be connected to a drive motor, as well as one or more hydrostatic devices that can operate as motors and can in each case be connected to one rotor, respectively, in order to drive said rotor, and are supplied by the hydrostatic device operating as a pump. The torque provided at a rotor and/or the speed thereof can be varied very quickly by a hydrostatic drivetrain of this kind, in that one or more hydrostatic control variables, such as the displacement volume of one or more hydrostatic devices, and/or the adjustment angle of one or more adjustable hydrostatic devices, and/or the pressure acting in the hydrostatic system, and/or the volume flow rate, are varied. In this case, such quick adjustability of the torque and/or the speed is also available in the case of operation at a high power level, at high torques and/or high speeds, in order to lift large bearing loads.

If aerial drones comprising a plurality of rotors, for example in the form what are known as multicopters, are used, a hydrostatic drive system of this kind allows for the mentioned precise, quick controllability of the torque and/or speed for each rotor individually. In particular, a plurality of hydrostatic devices may be provided, which are each connected to one of the rotors, respectively, in order to drive the respective rotor, such that the speed and/or the torque of the relevant rotor can be adjusted individually by means of adjusting the relevant hydrostatic device, which can take place individually.

Advantageously, the drive motor that drives a hydrostatic device operating as a pump can be formed as an internal combustion engine, for example in the form of a diesel engine. An internal combustion engine of this kind can provide a sufficiently high power, even over longer operating times, in order to achieve load-bearing capacities of the aerial drone that are sufficient for lifting larger loads.

In this case, it may be advantageous to operate the mentioned internal combustion engine in an at least approximately stationary operating state, in particular substantially at full load, at least while a lifting task is completed. The control of the lifting and/or tensile force and/or the flight trajectory of the aerial drone can be achieved by adjusting a hydrostatic control variable of the hydrostatic transmission or of the hydrostatic drivetrain, in particular also exclusively by adjusting one or more hydrostatic control variables.

In an advantageous development of the invention, an aerial drone of this kind comprising a hydrostatic drivetrain can cooperate with a ground supply station which can be coupled to the aerial drone. In particular, a supply station of this kind on the ground can comprise a cooling and/or filtering unit that can be coupled to the hydrostatic supply circuit of the hydrostatic drivetrain and cool and/or filter the hydraulic fluid of the hydrostatic drivetrain of the aerial drone.

Alternatively or in addition, the mentioned supply station can also comprise a pressure source which can be coupled to the hydrostatic drivetrain of the aerial drone and can preload the hydrostatic drivetrain, in particular can provide and/or set a target operating pressure desired there.

In order to adjust the control system of the aerial drone to the crane or to further aerial drones in a simple manner, and render operation simple for the machine operator, the above-mentioned, common controller can comprise a main control unit having input means, from which unit control signals are generated and transmitted to the at least one aerial drone and/or the crane, on the basis of the input desired movements, and an additional control unit from which control commands for at least one further aerial drone are generated and transmitted, depending on the flight or crane movements that were triggered by the main control unit. The mentioned additional control unit can be connected to the main control unit and be designed to generate, on the basis of the control signals generated by the main control unit, control signals for the additionally used aerial drones that are automatically adjusted to said control signals generated by said main control unit.

For example, the mentioned additional control unit can comprise a follow-up control module, by means of which the additional aerial drone is controlled so as to automatically follow the crane movements and/or the flight movements of a main drone, without the machine operator having to, for this purpose, especially input desired movements for the addition aerial drone.

In this case, the mentioned additional control unit can advantageously be designed such that the additional aerial drone cannot only maintain a desired relative position relative to the crane or the mentioned main drone, but rather such that the mentioned relative position can also be specified and changed in a variable manner, for example also such that the mentioned relative position changes continuously during a lifting procedure. For example, the additional control unit can specify a particular path relative to the crane, for the additional aerial drone, which path the aerial drone flies during a lifting procedure or depending on the position of the lifting hook. If, for example, an elongate beam is lifted in an approximately horizontal orientation, from a starting position that is initially in parallel with the jib, and if said elongate beam is intended to be placed down by the crane jib, at the destination, in an orientation that is rotationally offset with respect thereto, for example is approximately perpendicular to the vertical plane, the additional control unit can determine a flight path for the aerial drone, the starting point of which can for example be approximately perpendicularly below the crane jib, and can then extend in a helical manner around a perpendicular, through the carriage of the crane, in order to rotationally offset the elongate beam relative to the crane jib during the lifting movement of the lifting hook.

In order to allow for simple operation of the aerial drone, in a development of the invention the aerial drone can also be actuated, depending on a crane and/or lifting hook position or a position of a further drone, such that the aerial drone automatically follows crane or lifting hook movements and/or movements of a guide drone, and at least approximately maintains or attempts to maintain and follows a desired position relative to the crane and/or the lifting hook thereof, and/or relative to the guide drone, even in the event of crane movements, in particular lifting hook movements, and/or guide drone movements. If the aerial drone is used in connection with a crane, for example, the aerial drone can automatically follow the lifting hook of the crane when in an activated, automatic tracking mode. If, for example, a relative position of the aerial drone approximately at the lifting hook height or slightly above, and at a lateral spacing from the vertical center plane of the crane is desired and set by the jib, the aerial drone can automatically reduce or increase its flying height if the lifting hook if lowered or lifted, and/or can fly forwards or back, in parallel with the center plane of the crane, if the crane carriage of the crane is displaced, and/or fly laterally transversely to the left or right is the crane is rotationally offset.

Advantageously, however, the aerial drone can also be autonomously remote-controlled, such that the aerial drone can freely approach different positions relative to the crane and/or to the guide drone. This can be achieved for example by inputting a desired position for the aerial drone relative to the lifting hook, for example such that a position relative to the lifting hook, for example in the form of "2 m above and laterally to the right of the lifting hook", can be input in a position control module that may be provided in the crane operator cabin or a driver's cabin or a remote control station. Alternatively or in addition, however, the aerial drone can also be flown in a manner entirely free with respect to the crane or a guide drone, for example by means of a joystick, in order to fly the aerial drone until a desired relative position is reached. In an automatic mode, the common control device can automatically maintain or attempt to maintain the relative position approached, and follow any lifting movements of the lifting hook or of the guide drone.

In order to be able to position the aerial drone relative to the crane lifting hook or relative to the guide drone, and automatically follow the movements thereof, the aerial drone can be position-controlled in a relative coordinate system that is fixed with respect to the crane or is fixed with respect to the guide drone. For this purpose, a position determination means can be provided, which means continuously or cyclically determines the flight position of the aerial drone relative to the crane and/or to the guide drone, wherein a position determination means of this kind may for example comprise a signal-locating means which can locate signals that originate from the aerial drone and/or are sent to the aerial drone, and/or can evaluate said signals with respect to particular signal characteristics, in order to determine therefrom the relative position of the aerial drone with respect to the lifting hook or to the guide drone.

A signal-locating means of this kind can for example be realized such that a plurality of transceiver units are attached to the crane or the guide drone, which units communicate with a transceiver unit on the aerial drone, such that the position of the aerial drone relative to the crane or the guide drone can be determined from the signal propagation times and/or signal strengths and/or signal directions within the meaning of the connection lines between the various transceiver units on the crane or machine side and the transceiver unit of the aerial drone.

The mentioned transceiver units can for example be transponder or close-range transceiver units. In the case of a crane, the mentioned transceiver units can for example be attached to the boom, the crane carriage, the tower, and/or the lifting hook itself. In particular, the signal propagation times from the relevant transceiver unit on the crane or the machine to the aerial drone and/or back from the aerial drone to the transceiver unit on the machine can be determined, and/or signal strengths can be recorded and/or the directions in which the maximum signal strengths arise, can be determined, in order to determine the position of the aerial drone relative to the crane, from the signal propagation times and/or signal strengths and/or signal directions of maximum signal strength.

Alternatively or in addition to a relative position determination of this kind in a coordinate system that is fixed with respect to the machine, the positions of both the aerial drone and the crane, in particular the lifting hook, or of the aerial drone, can in each case be determined in an absolute coordinate system, such that the relative position can in turn be determined from the two absolute positions, and for example the aerial drone can be actuated in the manner described above, such that the aerial drone automatically follows or attempts to follow the movements of a lifting hook or a guide drone.

The absolute position determination mentioned can be achieved for example by means of a tracking system, for example a GPS system. For example, both the aerial drone and the lifting hook can be equipped with one GPS unit, respectively, in order to determine both the absolute spatial position of the lifting hook and the absolute spatial position of the aerial drone. The spatial position of the lifting hook can, however, also be approximately determined from the known movement and/or position data of the work machine components, such as the angle of rotation of a revolving tower crane, the crane carriage position, and the lifting hook height, from which, in the case of a known installation site, the lifting hook position can be determined at least approximately, in particular ignoring pendulum motions and/or wind influences.

In an advantageous development of the invention, the position control of the aerial drone can also be controlled in accordance with working range limits and/or construction site model data, and/or obstacle acquisition data, which can be obtained on the aerial drone itself. If the aerial drone is for example operated in the automatic tracking mode described above, in which the aerial drone automatically follows the lifting hook of a crane, it could for example be the case that, in the event of the crane being rotationally offset about the upright tower axis thereof, the aerial drone flies together therewith in a laterally transverse manner, in order to maintain the position relative to the lifting hook, and in the process collides with a part of a building, although the lifting hook itself has not yet reached the part of the building. In order to prevent this, the position control device of the aerial drone can take account of working range limits and/or construction site model data, and/or can itself comprise obstacle identification means, for example using a radar or ultrasound sensor, in order to be able to identify obstacles. The automatic follow-up control can be overdriven, and the automatic tracking mode can be overridden if a working range limit and/or a part of a building from the construction site model dataset, or an obstacle, is reached. The aerial drone can advantageously then also automatically calculate an alternative route which takes account of the working range limit and/or avoids an obstacle, wherein the avoidance route is advantageously determined such that the lifting hook or the work tool remains in the field of view of the imaging sensor system of the aerial drone.

Alternatively or in addition to the mentioned position control, the common controller can also comprise a lifting and/or tensile force control module, by means of which specified operating parameters of the aerial drone, such as the rotor speed and/or angle of attack, are controlled such that a load suspension device on the aerial drone, for example a hoist rope that connects the drone to the load or the lifting hook, is subjected to a desired force, in particular having a specified force magnitude and/or a specified force direction. For example, a suitable sensor system can monitor the tensile stress and/or the inclination of the hoist rope, which connects the drone to the load, relative to the horizontal, and on the basis thereof the aerial drone can be actuated so as to pull the load, by means of the drone, in a specified direction and at a specified strength or force.

BRIEF DESCRIPTION OF THE DRAWINGS

The invention will be explained in greater detail in the following, with reference to a preferred embodiment and accompanying drawings. In the drawings.

DETAILED DESCRIPTION

Figure 1:
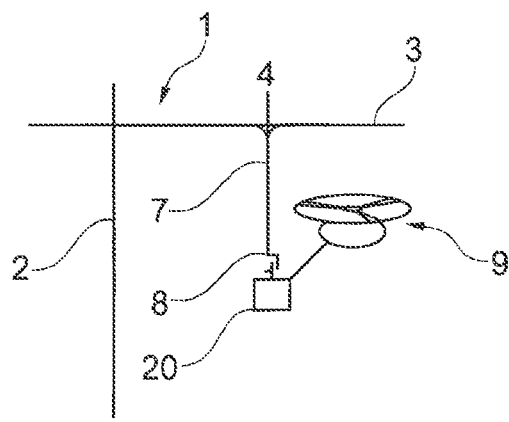
FIG. 1: is a schematic side view of a crane in the form of a revolving tower crane, comprising a load that is fastened to the lifting hook, and an additional aerial drone that is connected to the load.

As shown in FIG. 1, the crane 1 can be designed as a revolving tower crane, the tower 2 of which supports a jib 3 on which a crane carriage 4 is displaceably mounted. Depending on the design of the crane as a top-slewing or bottom-slewing crane, the jib 3, together with the tower 2 or without the tower 2, can be rotated about an upright axis, for which purpose a slewing gear drive is provided. The jib 3 could optionally also be formed so as to be able to rock up and down, about a horizontal transverse axis, wherein a suitable rocker drive could be provided, for example in a manner cooperating with the jib anchoring. The mentioned crane carriage 4 can be displaced by means of a cross travel winch or another cross travel drive.

The mentioned drive devices can be actuated by a control device 5 which may comprise a stationary operating unit having suitable input means 19, for example in the form of a joystick in the crane operator cabin 6 or on the control station of the crane, or a remote control station, and/or can also comprise a mobile operating unit having corresponding input means. A mobile operating unit of this kind can be designed for example in the form of a radio remote control which the crane operator can carry with them when walking over the construction site within the crane working range, in order to be able to also control the crane outside the crane operator's cabin 6.

In order for it to be possible to manipulate the lifting hook 8, which may be connected to a hoist rope 7 running down from the crane carriage 4, or a load 20 received thereon, in cooperation with the lifting hook 8, according to the invention at least one aerial drone 9 is provided, which is connected to the load 20 and/or to the lifting hook 8 by a traction and/or thrust means, in particular a hoist rope or a push rod.

In order to provide an improved overview of the manipulation task, in addition to manipulating the load, at least one camera can be mounted on the aerial drone, by means of which a camera image of the lifting hook 8 and/or the lifting hook surroundings can be provided. The mentioned camera image is advantageously a live or real-time image within the meaning of a television or video image, and is transmitted wirelessly from the camera 10 of the aerial drone 9 to a display unit and/or the control device 5 of the crane 1, wherein the mentioned display unit can for example be a machine operator display in the manner of a tablet or a screen or a monitor, which can be mounted in the crane operator's cabin 6. If, in the manner described above, a remote control station or a mobile operating unit is used for controlling the crane 1, the mentioned display unit 11 can be provided in the remote control station or on the mobile operating unit.

The aerial drone 9 is provided with a remote control device 12 which makes it possible to perform remote control of the aerial drone 9, in particular to actuate the flight control units such as rotor blades, in order to remotely control the flight position of the aerial drone 9.

A corresponding remote control module is advantageously integrated in the controller 5 and/or can be provided in the crane operator's cabin 6 and/or the remote control station or the mobile operating unit, for example can be equipped with corresponding joysticks.

Figure 7:
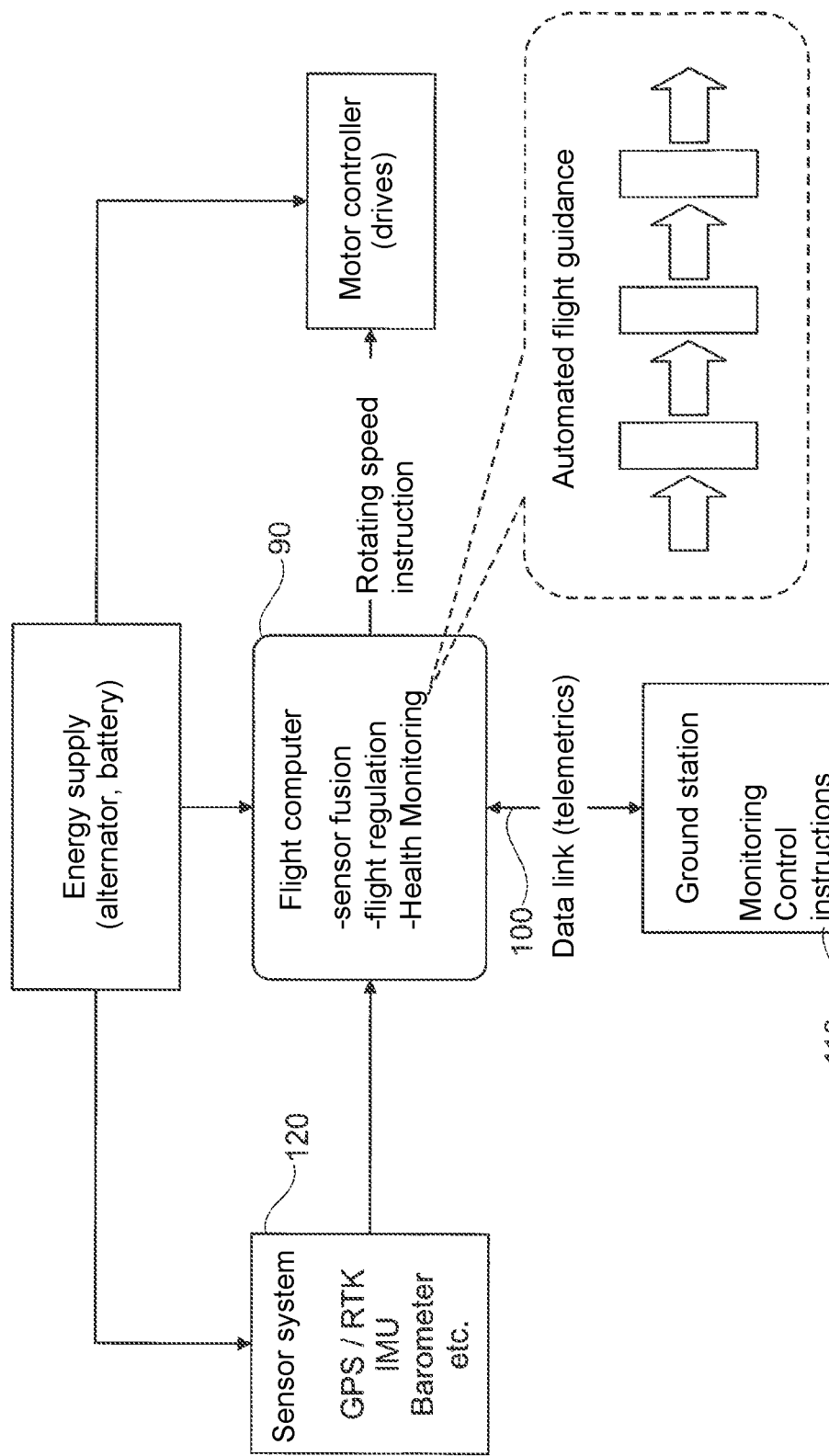
FIG. 7: is a schematic view of a control hierarchy for controlling an aerial drone.

As shown in FIG. 7, the control system of the aerial drone 9a; 9b can comprise a flight computer 90 which may be provided on the aerial drone and may comprise for example one or more microprocessors, one or more program memories, and further hardware and/or software components, in order to process a flight control program. As FIG. 7 furthermore shows, the mentioned flight computer 90 can communicate with a base station 110 via a communications link 100, for example a radio link, in order to transmit data from the flight computer 90 to the base station 110, or vice versa from the base station 110 to the flight computer 90. For example, telemetry data, such as the GPS position, rotor speed, lifting force and other drone parameters can be transmitted from the flight computer 90 to the base station 110, in order to be monitored and/or evaluated there. Alternatively or in addition, the base station 110 can transmit data such as control signals to the flight computer 90, in order to influence the control of the aerial drone there.

In this case, said flight computer 90 can be supplied with sensor signals from a sensor system 120 provided on the aerial drone 9a; 9b, which sensor signals specify a current operating state of the aerial drone and/or movement parameters, for example a position signal such as a GPS position, air pressure, wind speed, compass data or the like.

On the basis of the sensor data of the sensor system 120, and/or on the basis of the data received by the base station 110, the flight computer 90 can perform or process flight regulation and/or control and actuate drives of the aerial drone, in particular in order to vary a speed and/or a torque of a relevant rotor.

Figure 6:
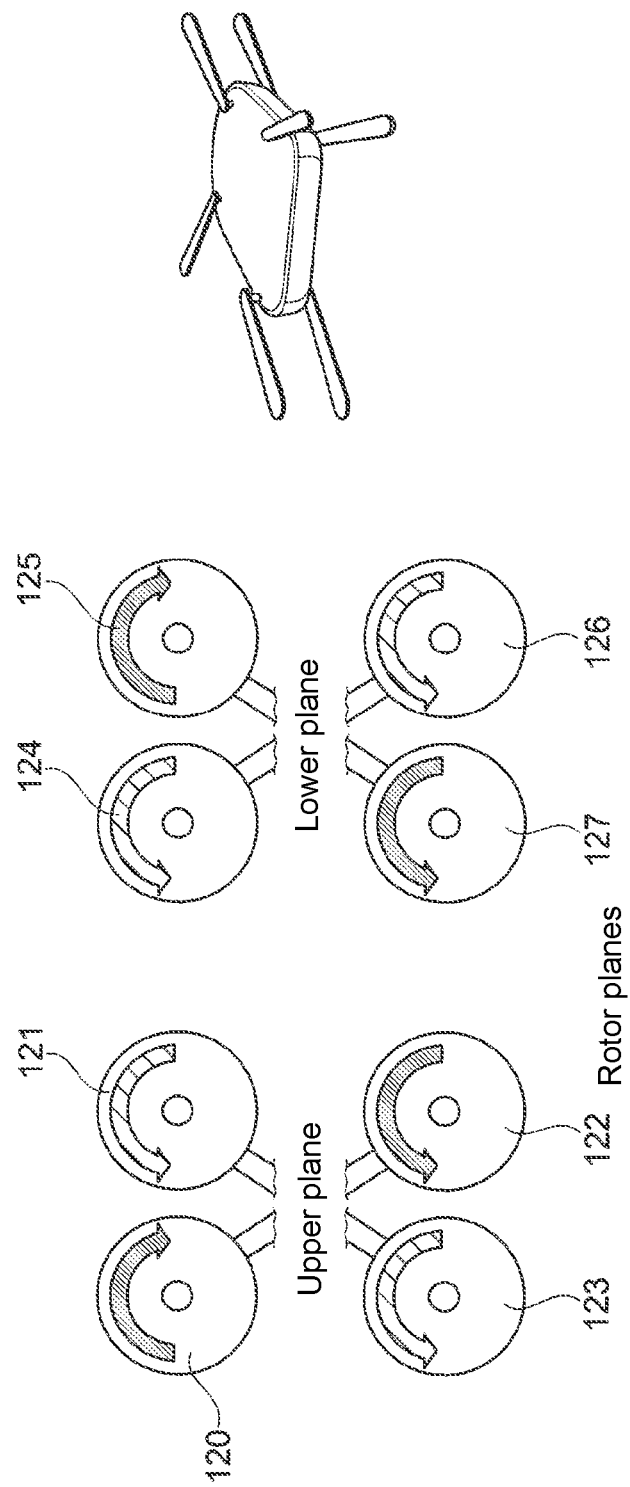
FIG. 6: is a schematic view of the total of eight rotors of an aerial drone, which rotors are distributed over two planes and implement different directions of rotation according to the plane, and in one plane, according to the side.

As shown in FIG. 6, the aerial drone 9a; 9b may comprise a plurality of rotors 120 to 127 which can be arranged for example above one another in two planes, and can be arranged in a crosswise manner in each plane. In this case, the drives of the rotors 120 to 126 and/or the drive transmission thereof are advantageously configured such that rotors that are opposite one another in one plane, i.e. for example 120 and 122, and 121 and 123, in each case rotate in the same direction, whereas adjacent rotors rotate in opposite directions. In this case, the directions of rotation in the two rotor planes can be reversed, such that a pair of rotors located above one another/below one another, in the two rotor planes, rotate in contrary directions; cf. FIG. 6.

In the case of a multicopter of this kind, the flight movement and/or the bearing load or hoisting and/or tensile load provided can be purposely controlled by the thrust distribution, at the rotors, in particular in that the speed of the individual rotors 120 to 126 and/or the torque thereof is varied individually, in pairs or in groups, in order to cause the aerial drone 9a, 9b to climb and/or descent, and/or to bring about pitching and/or rolling and/or yawing.

Figure 5:
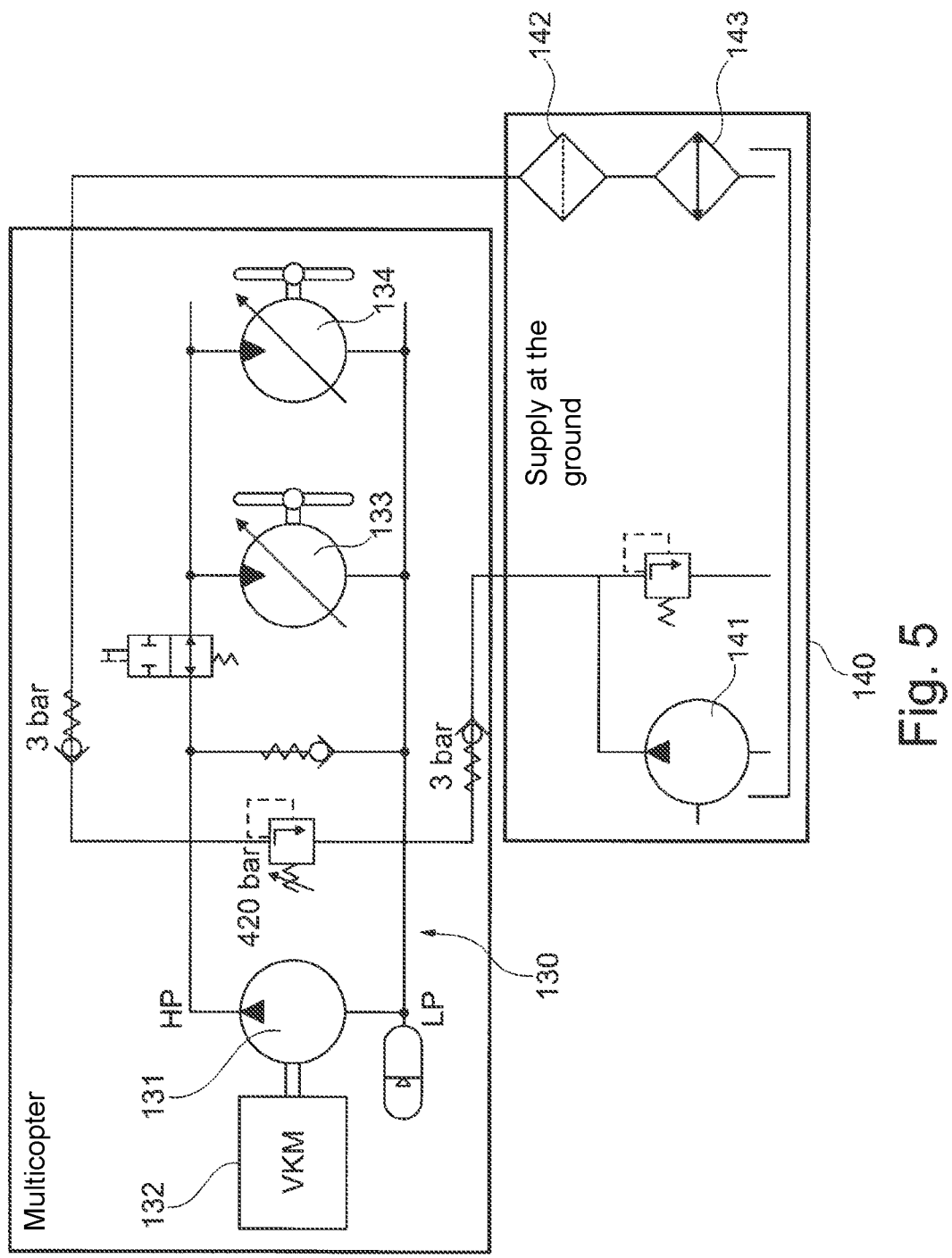
FIG. 5: is a schematic view of the hydraulic drivetrain of an aerial drone, according to an advantageous embodiment of the invention, wherein a supply station, to which the hydrostatic drivetrain of the aerial drone can be coupled, is furthermore shown, by means of which supply station the hydrostatic drivetrain can be preloaded, cooled and filtered.

As shown in FIG. 5, in this case the aerial drone 9a; 9b can advantageously comprise a hydraulic drivetrain 130 for driving the rotors 120 to 127, wherein the hydraulic drivetrain 130 or the hydrostatic transmission can comprise a hydrostatic device 131 which operates as a pump and which can be driven by a drive motor 132. The mentioned drive motor 131 can advantageously be designed as internal combustion engine ICE, for example in the form of a diesel engine, or a petrol engine, or a gas combustion engine.

The hydrostatic drivetrain 130 furthermore advantageously comprises a plurality of further hydrostatic devices 133 and 134, which are each connected to one of the rotors 120 to 127, respectively, and can be supplied by the hydrostatic device 131 that operates as a pump. In this case, FIG. 5 shows just two hydrostatic devices 133 and 134 that operate as motors. It goes without saying, however, that further hydrostatic devices of this kind, operating as motors, can be provided, in order to be able to drive each of the individual rotors of the aerial drone 9a; 9b. Further hydrostatic devices of this kind can in particular be connected in parallel with the hydrostatic devices 133 and 134 shown, by means of the supply and return lines that are connected to the hydrostatic device 131 operating as a pump.

The hydrostatic devices 131, 133 and 134 mentioned are advantageously in each case designed as adjustable hydrostatic devices, the displacement volume or pump capacity of which can be varied. For example, swash plate units can be used, which units are designed such that the adjustment angle thereof can be set.

In order to control and/or regulate the torque and/or the speed of the relevant rotor 120 to 127, in particular the following procedure can be carried out: Advantageously, the drive motor 132 can be operated at least approximately constantly, for example at full load or at least approximately at full load, or in an operating range that is favorable with respect to efficiency. The hydrostatic device 131 driven by the internal combustion engine 132 converts the rotational drive movement of the drive motor 132 into hydraulic pressure, which supplies the further hydrostatic devices 133, 134. Adjusting the mentioned hydrostatic devices 133 and 134 make it possible t to vary the torque and/or speed of the rotors that are drivingly connected thereto. Alternatively or in addition, however, it is also possible to use further hydraulic actuators in the hydrostatic drivetrain, in order to control the rotors, for example by means of pressure control valves, mass flow throttles, etc.

As FIG. 5 furthermore shows, it is advantageously possible for the aerial drones 9a, 9b to be coupled to a supply station 140 that can be installed on the ground or at another location, for example on the crane, in order to cool and/or filter and/or pressure preload the hydrostatic drivetrain of the aerial drone. As shown in FIG. 5, the supply station 140 can comprise a pressure source 141 which can be coupled to the hydrostatic drivetrain for example by means of a non-return valve and/or a check valve, in order to preload the hydrostatic pressure circuit to a desired target operating pressure.

Alternatively or in addition, the supply station may comprise a filter device 142 and/or a cooling means 143 which can likewise be connected to the hydrostatic drivetrain in order to filter and/or cool the hydraulic oil when the aerial drone is coupled to the supply station 140.

In order to allow for simple operation, the common controller 5 can comprise a main controller 5a having input means 19 for inputting desired flight and/or crane movements, from which control signals are generated and transmitted to the at least one aerial drone 9a and/or the crane 1, on the basis of the input desired movements, and an additional controller 5b from which control commands for the at least one and/or the further aerial drone 9a; 9b are generated and transmitted, depending on the flight or crane movements that were triggered by the main controller 5a.

Advantageously, the position of the aerial drone 9 relative to the crane 1 and/or the lifting hook thereof can be controlled largely autonomously and independently of the crane, at least in an autonomous control mode, for example in a manner known per se by means of the mentioned joystick of the remote control device 12. A desired position of the aerial drone 9 relative to the lifting hook 8 can be approached by means of the autonomous control module of the position control device 13.

In addition to an autonomous position control module of this kind, the common control device 5 or the additional controller 5b thereof, in particular the position control device 13 thereof, can comprise an automatic follow-up control module, in order to maintain a predetermined position of the aerial drone 9, for example the desired position arbitrarily approached by the autonomous position control module, aerial drone a predetermined pre-programmed position, even if the crane 1 performs crane movements and/or the lifting hook 8 is moved, such that the aerial drone 9 follows the lifting hook 8 in a largely autonomous manner and maintains the predetermined relative position with respect thereto.

A position determination means 18 is advantageously provided, which means automatically determines the position of the aerial drone 9 relative to the crane 1 and/or the lifting hook 8 thereof in a continuous and/or cyclical manner, such that the position control device 13 can actuate the aerial drone 9 in accordance with the determined relative position.

For this purpose, the aerial drone 9 can comprise a GPS unit 14 for example, by means of which the absolute spatial position of the aerial drone 9 is determined and transmitted to the position control device 13. In addition, the position of the lifting hook 8 can be determined, such that the position control device 13 can remotely control the aerial drone 9 in order to maintain the relative position.

In this case, the lifting hook position can essentially also be determined by means of GPS, for example in that a GPS unit is integrated in the lifting hook. Alternatively or in addition, however, the lifting hook position can also be determined from the position of the crane components, in particular calculated by the control device 5 of the crane, for example in that the angle of rotation of the jib, the position of the crane carriage 4 on the jib 3, and the uncoiled length of the hoist rope 7 are recorded, from which, in the case of a known installation site of the crane 1, the lifting hook position can be determined at least approximately, if the dynamic pendulum motions or wind influences are ignored.

Alternatively or in addition to absolute position determination of this kind, the position of the aerial drone 9 can also be determined in a relative manner, in a coordinate system that is fixed with respect to the crane, i.e. that rotates together with the crane. For this purpose, transceiver units, for example in the form of transponder units 15, can be provided on the crane 1, for example on the jib 3 thereof and the tower 2 thereof, optionally also on the crane carriage 4 thereof and/or on the lifting hook 8 thereof, which units are advantageously attached at a plurality of mutually spaced locations on the crane 1. The mentioned transceiver units 15 can communicate with a corresponding transceiver unit 16 on the aerial drone 9. It is then possible, for example, for a locating means 17, which can be integrated in the control device 5 of the crane 1, to determine, from the signal propagation times of a signal between the transceiver unit 16 on the aerial drone 9 and the respective transceiver units 15 on the crane 1, the spacings between the aerial drone 9 and the respective transceiver units 15 on the crane 1, and, therefrom, the position of the aerial drone 9 relative to the crane 1.

In addition to the mentioned position control, the common controller 5 can also comprise a lifting and/or tensile force control module, by means of which specified operating parameters of the aerial drone 9a or 9b, such as the rotor speed and/or angle of attack, are controlled such that a load suspension device on the aerial drone, for example a hoist rope that connects the drone to the load 20 or the lifting hook 8, is subjected to a desired force, in particular having a specified force magnitude and/or a specified force direction.

For example, a suitable sensor system can monitor the tensile stress and/or the inclination $\varphi$ of the mentioned hoist rope, which connects the drone 9 to the load 20, relative to the horizontal, and on the basis thereof the aerial drone can be actuated so as to pull the load 20, by means of the drone 9, in a specified direction and at a specified strength or force.

Figure 3:
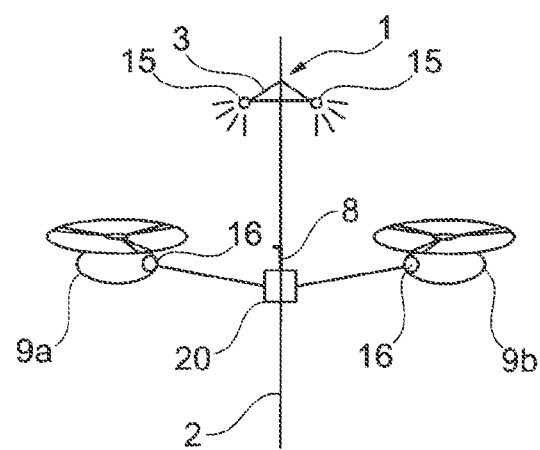
FIG. 3: is a front view of the crane from FIG. 1 in a viewing direction in parallel with the jib longitudinal axis, wherein two aerial drones positioned on opposing sides of the lifting hook are shown, which drones are connected to the load fastened to the lifting hook.
Figure 4:
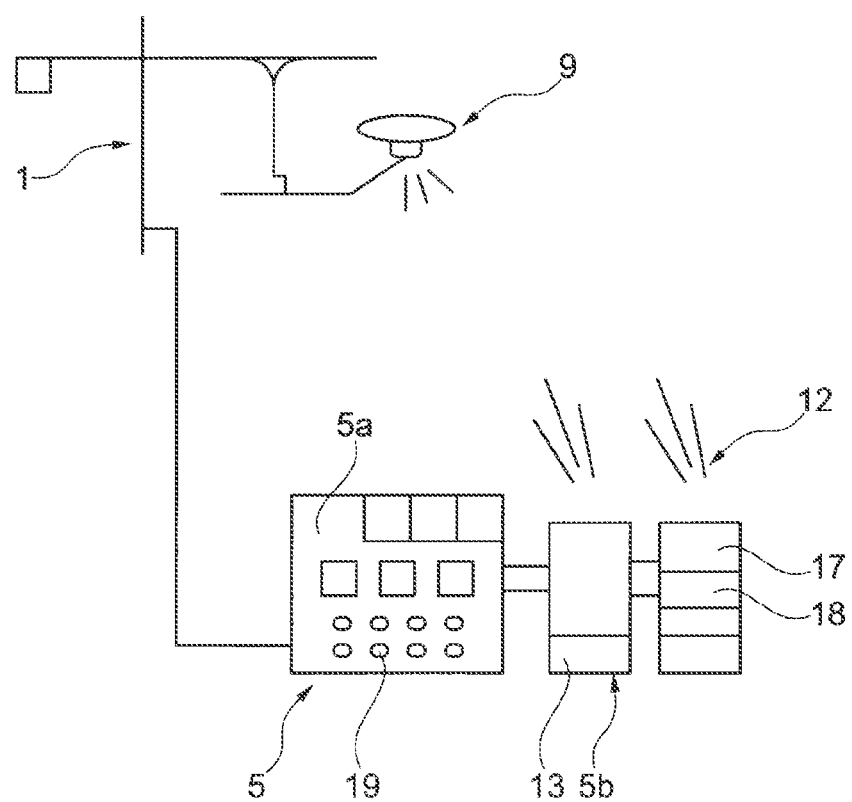
FIG. 4: is a schematic view of the common controller for controlling a crane, and the additional aerial drones for jointly lifting a load.

As FIG. 3 shows, it is also possible for a plurality of aerial drones 9a and 9b to be connected to the load 20 or the lifting hook 8, wherein it may be advantageous, for example, to position at least one pair of aerial drones 9a, b on opposing sides of the lifting hook 8, and connect them to the load 20 or the lifting hook 8 itself, in order to be able to exert horizontal forces $F_H$ on the lifting hook 8 or the load 20 suspended thereon in approximately mutually opposing directions, or mutually compensate said forces, if for example only the lifting ability of the aerial drones 9a, b is required.

Figure 2:
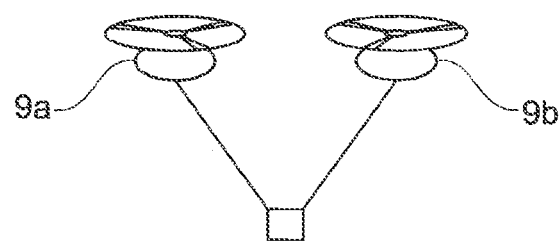
FIG. 2: is a schematic view of two aerial drones that are yoked together and connected to a common load.

In addition to the mentioned attachment of at least one aerial drone 9 to a crane 1, for specific lifting tasks it may also be advantageous to merely team-up a plurality of aerial drones 9a and 9b and lift the corresponding load by means of a plurality of aerial drones, but without the crane or the lifting hook thereof, as is shown for example in FIG. 2. It is thus possible, for example, to increase the operating range for a lifting task, which range is limited, in the case of a crane 1, by the radius thereof. Lifting a load 20 only by means of aerial drones can also be helpful when erecting the crane 1, in order, for example, to lift specific crane components when assembling the crane.

If a plurality of aerial drones 9a, b are yoked or teamed-up and used, without a crane, for lifting a load 20, the common controller 5 can keep the two aerial drones 9a and 9b at a distance from one another and fly said drones together, along a specified flight trajectory, to a target destination. In this case, the aerial drones 9a, b can be fastened to the common load by means of separate hoist ropes for example, or can be fastened to a common lifting yoke to which the load 20 is in turn fastened.

The invention claimed is:

1. A method of lifting a load comprising:
   lifting the load with an aerial drone and a lifting hook of a tower crane, wherein the aerial drone provides a lifting force to the load, wherein the tower crane comprises a jib from which a hoist rope with a lifting hook thereon is suspended, wherein the jib is rotatable about an upright axis of rotation, wherein the load is connected to the aerial drone and to the lifting hook of the tower crane;
   carrying and/or directing the load by controlling the aerial drone together with the tower crane in a mutually coordinated manner by a common controller configured to control the aerial drone and the tower crane, wherein the common controller is configured to control flight movements of the aerial drone, wherein the common controller comprises a main controller;
   inputting to the main controller desired flight and tower crane movements from which control signals are generated and transmitted to the aerial drone and the tower crane on the basis of the input desired movements;
   controlling the aerial drone by varying a flight trajectory of the aerial drone;
   wherein the aerial drone comprises a multicopter and carries a portion of the load;
   automatically determining, in a continuous or cyclical manner by a position determiner, the position of the aerial drone relative to the tower crane;
   actuating the aerial drone by a position control device on the basis of a signal of the position determiner such that a relative position between the aerial drone and the tower crane remains constant and/or follows a predetermined trajectory; and
   autonomously remotely controlling the aerial drone in an autonomous control mode such that the aerial drone freely approaches various desired positions relative to the tower crane and/or relative to a guide drone.

2. The method of claim 1, further comprising:
generating and transmitting from an additional controller control commands for the aerial drone, wherein the control commands depend on flight or tower crane movements that were triggered by the main controller.

3. The method of claim 1, further comprising:
Controlling the aerial drone by varying a rotor speed and/or a rotor torque a lifting and/or tensile force of the aerial drone, wherein the aerial drone comprises a hydrostatic device drivetrain;
driving by the hydrostatic device drivetrain at least one rotor comprising a first hydrostatic device that operates as a pump and is drivable by a drive motor, and a second hydrostatic device that operates as a motor and is connectable to the at least one rotor; and
controlling a rotor speed and/or a rotor torque by adjusting a hydraulic control variable of the hydrostatic device drivetrain, wherein the hydraulic control variable comprises a hydrostatic device displacement volume and/or a hydrostatic device swivel angle and/or a pressure in a hydrostatic pressure circuit and/or a mass flow in the hydrostatic pressure circuit.

4. The method of claim 3, wherein the drive motor comprises an internal combustion engine, and the method further comprising:
operating the internal combustion engine in a constant operating state in the full load range, wherein speed changes and/or torque changes on the at least one rotor are controlled in a variable manner by adjusting the first hydrostatic device and/or the second hydrostatic device.

5. The method of claim 1, wherein the aerial drone comprises a plurality of rotors configured to each be driven by a respective hydrostatic device, wherein the hydrostatic devices and the speed of the respectively connected rotors are adjusted individually to control the flight trajectory and/or the pulling direction of the aerial drone.

6. The method of claim 1, further comprising:
controlling the aerial drone such that a force having a horizontal component is exerted on the load, wherein the horizontal component counteracts a pendulum motion of the load and/or counteracts a wind force, and/or a tower crane hoist rope is held in as vertical an orientation as possible.

7. The method of claim 1, further comprising:
controlling the aerial drone such that the load is rotated about a vertical axis while being lifted; and
flying the aerial drone along a helical trajectory about a vertical axis through the load, wherein the flying is while lifting of the load.

8. The method of claim 1, further comprising:
actuating the aerial drone depending on the tower crane and/or the lifting hook position such that the aerial drone automatically follows movements of the tower crane and/or the lifting hook and maintains a desired position relative to the tower crane and/or the lifting hook even in the event of movements of the tower crane.

9. The method of claim 1, further comprising:
controlling specified operating parameters of the aerial drone by the common controller such that a load suspension device on the first aerial drone is subjected to a specified force magnitude and/or a specified force direction,
wherein the load suspension device connects the aerial drone to the load or the lifting hook, and
wherein the specified operating parameters comprise the rotor speed and/or angle of attack.

10. A system for lifting a load comprising:
a tower crane having a lifting hook;
a first aerial drone;
a load suspension device for carrying at least a portion of the load;
a second aerial drone, wherein the load is connected to the lifting hook, the first aerial drone, and the second aerial drone such that the load is spread over the lifting hook, the first aerial drone, and the second aerial drone, wherein the first aerial drone is connected to the load by the load suspension device, wherein the first aerial drone provides a first lifting force to the load and the second aerial drone provides a second lifting force to the load, and wherein the first aerial drone and the second aerial drone each comprises a hydrostatic drivetrain,
wherein the tower crane, the first aerial drone, and the second aerial drone are controllable together, in a mutually coordinated manner, via a common controller for controlling flight movements of the first aerial drone, flight movements of the second aerial drone, and crane movements of the tower crane, wherein a rotor speed and/or a rotor torque of the first aerial drone and a rotor speed and/or a rotor torque of the second aerial drone are controllable via the common controller, in a mutually coordinated manner, by adjusting a hydrostatic volume and/or a hydrostatic swivel angle and/or a pressure of the hydrostatic drivetrain of the first aerial drone and by adjusting a hydrostatic volume and/or a hydrostatic swivel angle and/or a pressure of the hydrostatic drivetrain of the second aerial drone,
wherein the hydrostatic drivetrain of the first aerial drone and the second aerial drone each comprises an adjustable hydrostatic device, wherein the adjustable hydrostatic device is drivingly connected to a first rotor of the first aerial drone and a second rotor of the second aerial drone, and wherein at least one of a hydrostatic volume and a hydrostatic swivel angle of the adjustable hydrostatic device can be adjusted.

11. The system of claim 10, wherein the common controller comprises a main controller having an inputter for inputting desired flight movements of the first aerial drone and/or desired crane movements of the tower crane from which control signals are generated and transmitted to the first aerial drone and/or the tower crane on the basis of the input desired movements, and wherein the system further comprises an additional controller for generating control commands for the first aerial drone and/or the second aerial drone depending on the flight or crane movements that were triggered by the main controller.

12. The system of claim 10, wherein the common controller comprises a position control device which comprises an automatic follow-up control module for actuating the first aerial drone depending on a crane position of the tower crane and/or a lifting hook position of the lifting hook of the tower crane such that the first aerial drone automatically follows crane and/or lifting hook movements and maintains a desired position relative to the tower crane and/or the lifting hook, including during movements of the tower crane and/or a guide drone.

13. The system of claim 10, wherein the common controller is configured to actuate the first aerial drone such that, when lifting the load, the first aerial drone flies along a predetermined helical trajectory about an axis passing through the load.

14. The system of claim 10, further comprising a position control device comprising an autonomous control module for autonomous remote control of the first aerial drone such that the first aerial drone approaches various desired positions relative to a machine and/or a work tool of the machine.

15. The system of claim 10, further comprising:
   a position determiner for automatically determining the position of the first aerial drone relative to the tower crane and/or relative to a guide drone; and
   a position control device to control the first aerial drone depending on the automatically determined relative position.

16. The system of claim 15, wherein the first aerial drone comprises a GPS unit for absolute position determination for the first aerial drone, and wherein the position control device is configured to control the first aerial drone depending on absolute position data of the first aerial drone and on absolute position data of a material handling and/or construction machine and/or a work tool of the material handling and/or construction machine.

17. The system of claim 16, wherein the position determiner comprises a signal-locater for locating a signal output by the first aerial drone, wherein the signal-locater comprises mutually spaced transceiver units attached to the tower crane, and wherein the transceiver units are configured to communicate with a transceiver unit on the first aerial drone, and an evaluation unit for evaluating the transmitted signals between the transceiver units on a crane side and the transceiver unit on a drone side, with respect to predetermined signal characteristics comprising a signal propagation time and/or signal strength, and for determining the position of the first aerial drone relative to the tower crane from the signal characteristics.

18. The system of claim 10, wherein the hydrostatic drivetrain of the first aerial drone comprises a first hydrostatic device and a second hydrostatic device drivingly connected to a rotor of the first aerial drone, wherein the hydrostatic drivetrain of the first aerial drone is configured to operate as a motor, and wherein the first hydrostatic device comprises a pump, wherein the pump is drivable by a drive motor, and wherein the pump is suppliable with a pressure.

19. The system of claim 18, wherein the drive motor comprises an internal combustion engine.

20. The system of claim 18, wherein the first aerial drone is a multicopter and comprises a plurality of rotors, wherein the hydrostatic drivetrain of the first aerial drone comprises a plurality of second hydrostatic devices that comprise motors and are each drivingly connected to a respective rotor and are individually adjustable to individually control the speed of the respective rotors.

* * * * *